United States Patent
Wycech

[19]

[11] Patent Number: 6,149,227
[45] Date of Patent: Nov. 21, 2000

[54] REINFORCED STRUCTURAL ASSEMBLY

[75] Inventor: Joseph S Wycech, Grosse Pointe Woods, Mich.

[73] Assignee: Henkel Corporation, Gulph Mills, Pa.

[21] Appl. No.: 09/236,917

[22] Filed: Jan. 25, 1999

[51] Int. Cl.[7] .............................. B62D 25/04; C08J 9/32
[52] U.S. Cl. ........................ 296/188; 296/30; 296/901; 296/209; 296/203.03; 428/35.9; 428/36.5; 428/36.91; 52/232; 52/735.1
[58] Field of Search ........................... 296/188, 30, 146.6, 296/901, 189, 209, 203.3; 428/31, 304.1, 358, 35.9, 36.5, 36.91; 52/232, 309.8, 309.9, 735.1, 731.3

[56] References Cited

U.S. PATENT DOCUMENTS

| | | | |
|---|---|---|---|
| 4,751,249 | 6/1988 | Wycech | 521/54 |
| 4,836,516 | 6/1989 | Wycech | 267/279 |
| 4,853,270 | 8/1989 | Wycech | 428/68 |
| 4,861,097 | 8/1989 | Wycech | 296/188 |
| 4,923,902 | 5/1990 | Wycech | 521/54 |
| 4,978,562 | 12/1990 | Wycech | 428/35.8 |
| 5,124,186 | 6/1992 | Wycech | 428/35.8 |
| 5,213,391 | 5/1993 | Takagi | 296/205 |
| 5,575,526 | 11/1996 | Wycech | 296/205 |
| 5,755,486 | 5/1998 | Wycech | 296/188 |
| 5,766,719 | 6/1998 | Rimkus | 428/71 |
| 5,884,960 | 3/1999 | Wycech | 296/146.6 |
| 5,888,600 | 3/1999 | Wycech | 428/35.9 |
| 5,992,923 | 12/1999 | Wycech | 296/188 |
| 6,003,274 | 12/1999 | Wycech | 296/188 X |

FOREIGN PATENT DOCUMENTS

| | | |
|---|---|---|
| 0 891 918 A1 | 1/1999 | European Pat. Off. . |
| WO97/43501 | 11/1997 | WIPO . |

Primary Examiner—Joseph D. Pape
Attorney, Agent, or Firm—Wayne C. Jaeschke; Stephen D. Harper; Harold Pezzner

[57] ABSTRACT

A stiffener is provided for reinforcing a hollow structure having a pair of spaced walls. The stiffener includes a carrier member with a layer of expandable polymer which creates a structural foam when the polymer is later expanded. The stiffener could comprise a single laminate shaped to fit in the appropriate locations of the hollow structure so that when the polymer is expanded it forms a structural foam intimately bonded to the pair of spaced walls. The stiffener may also be in the form of a corrugated frame wherein individual laminates are provided with notches to permit the individual laminates to be interlocked with each other at the notches.

39 Claims, 6 Drawing Sheets

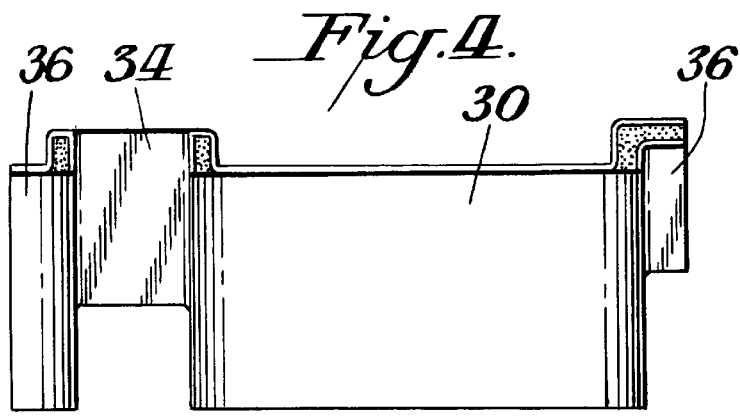
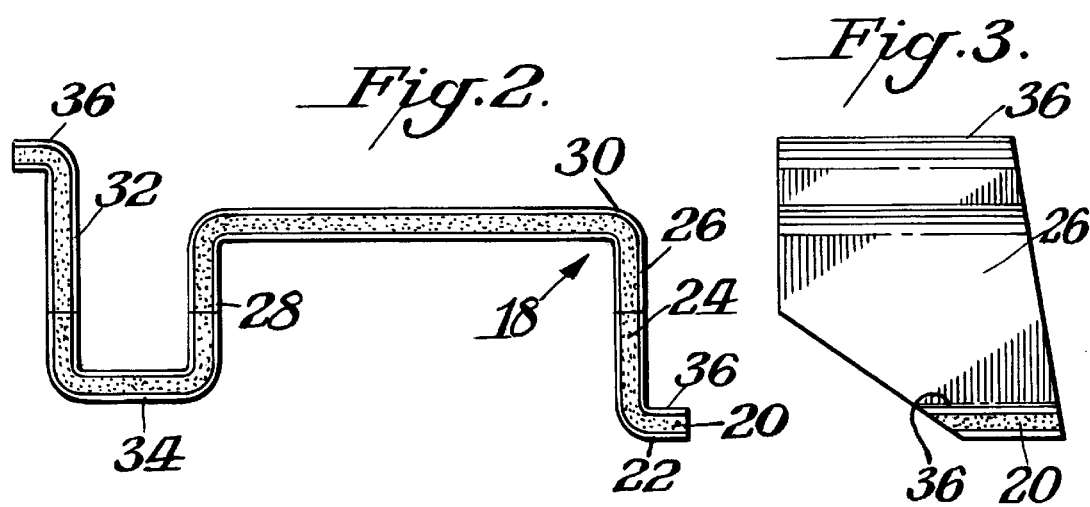
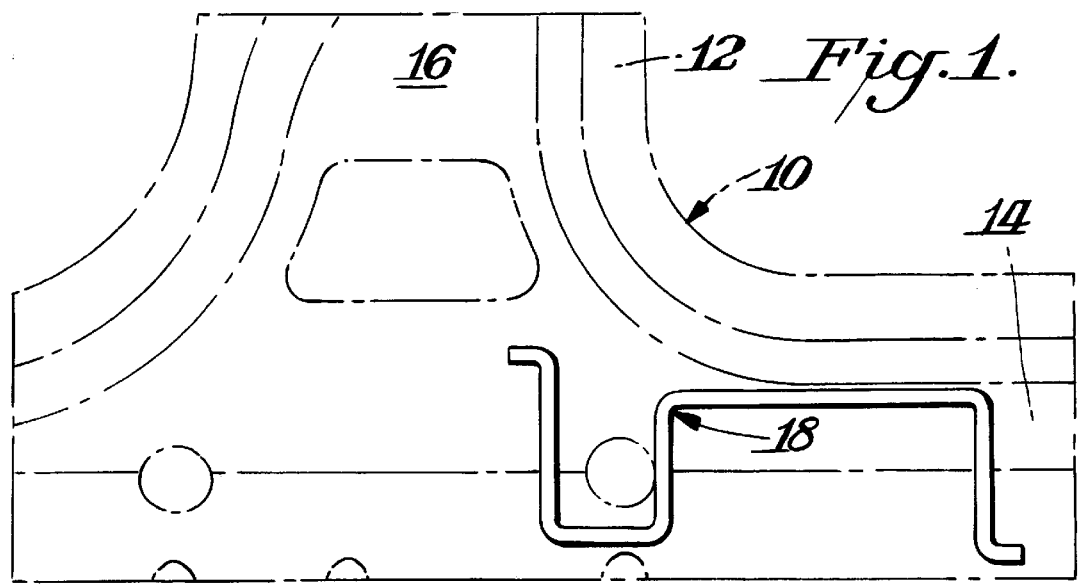

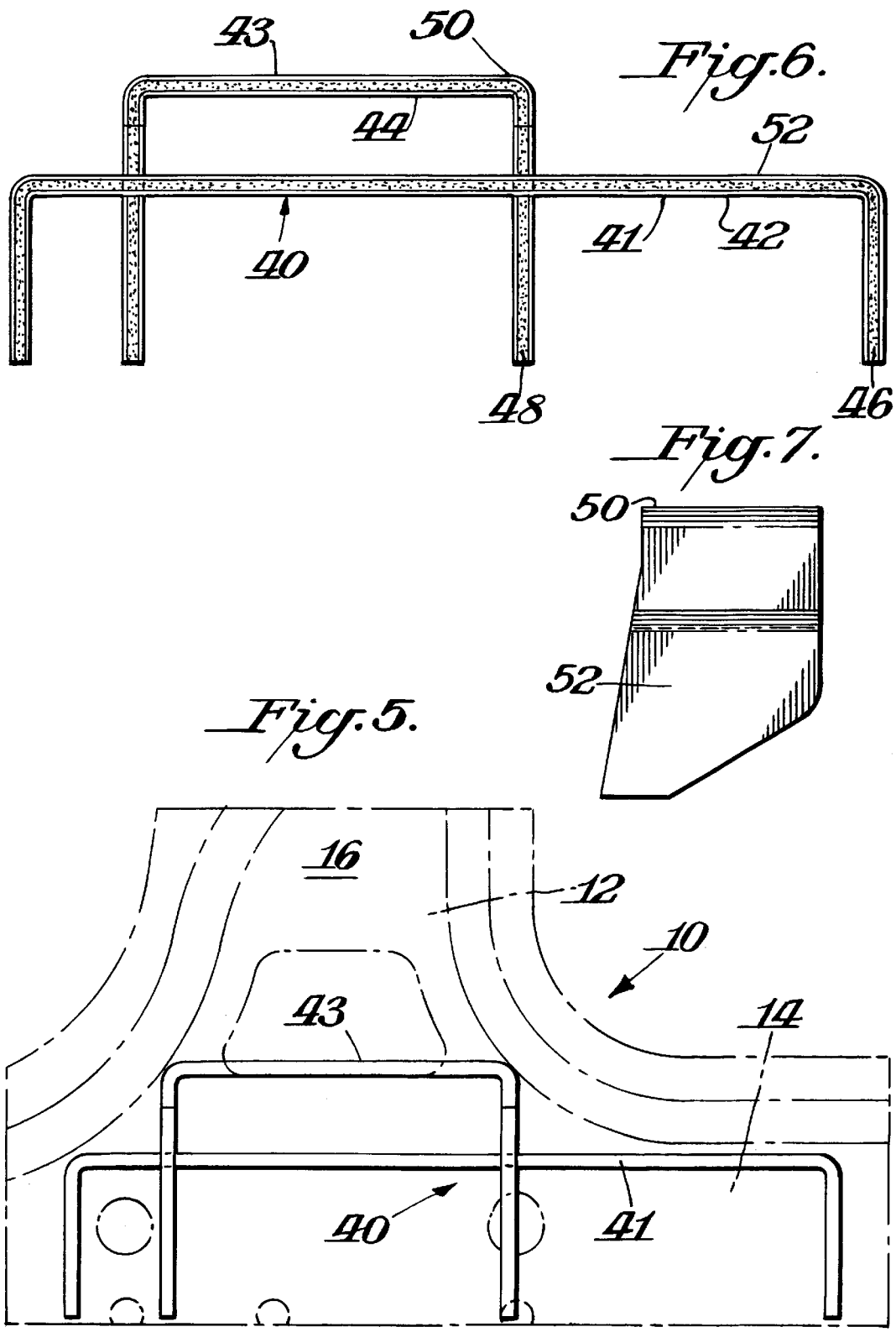

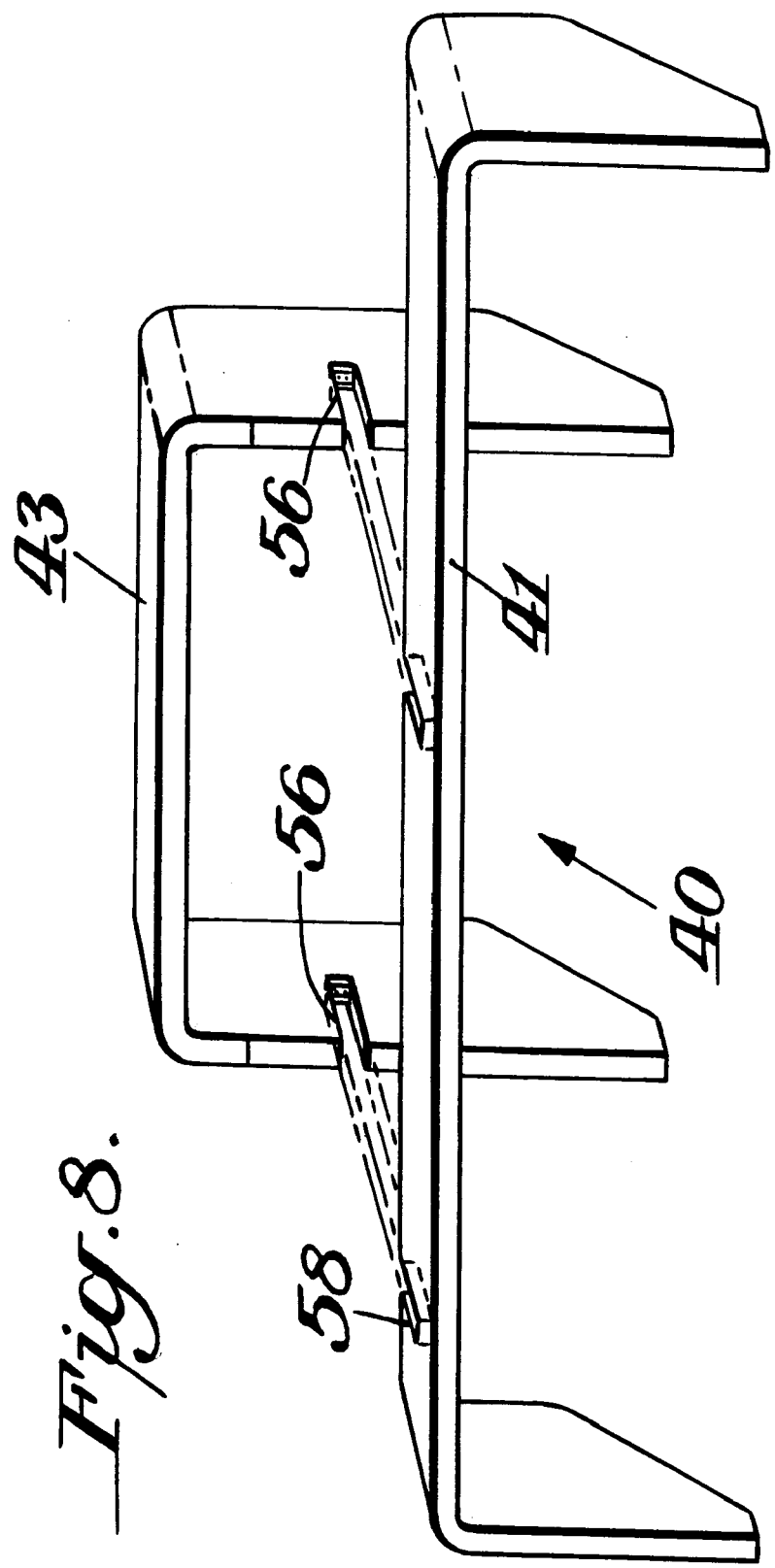

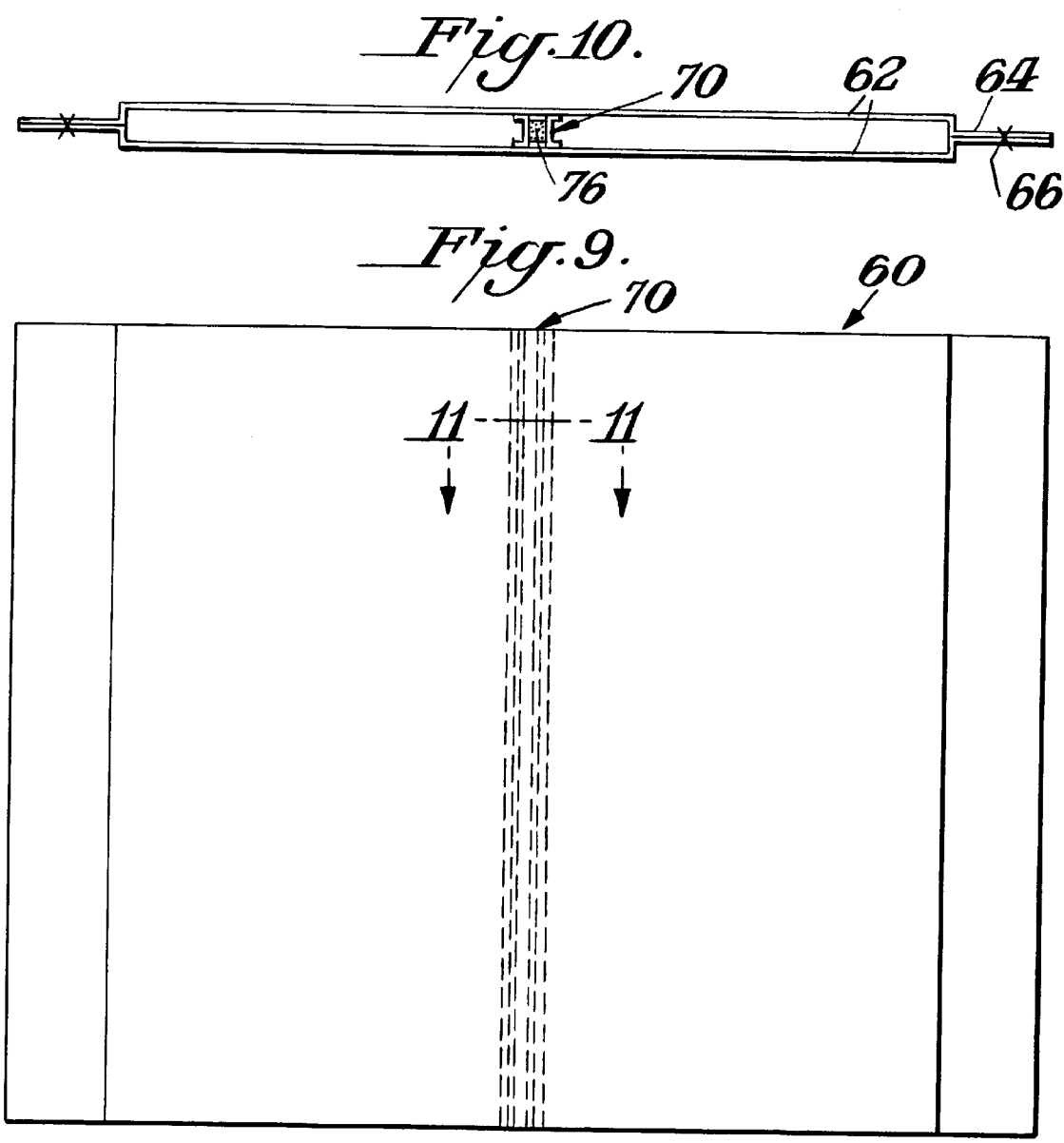

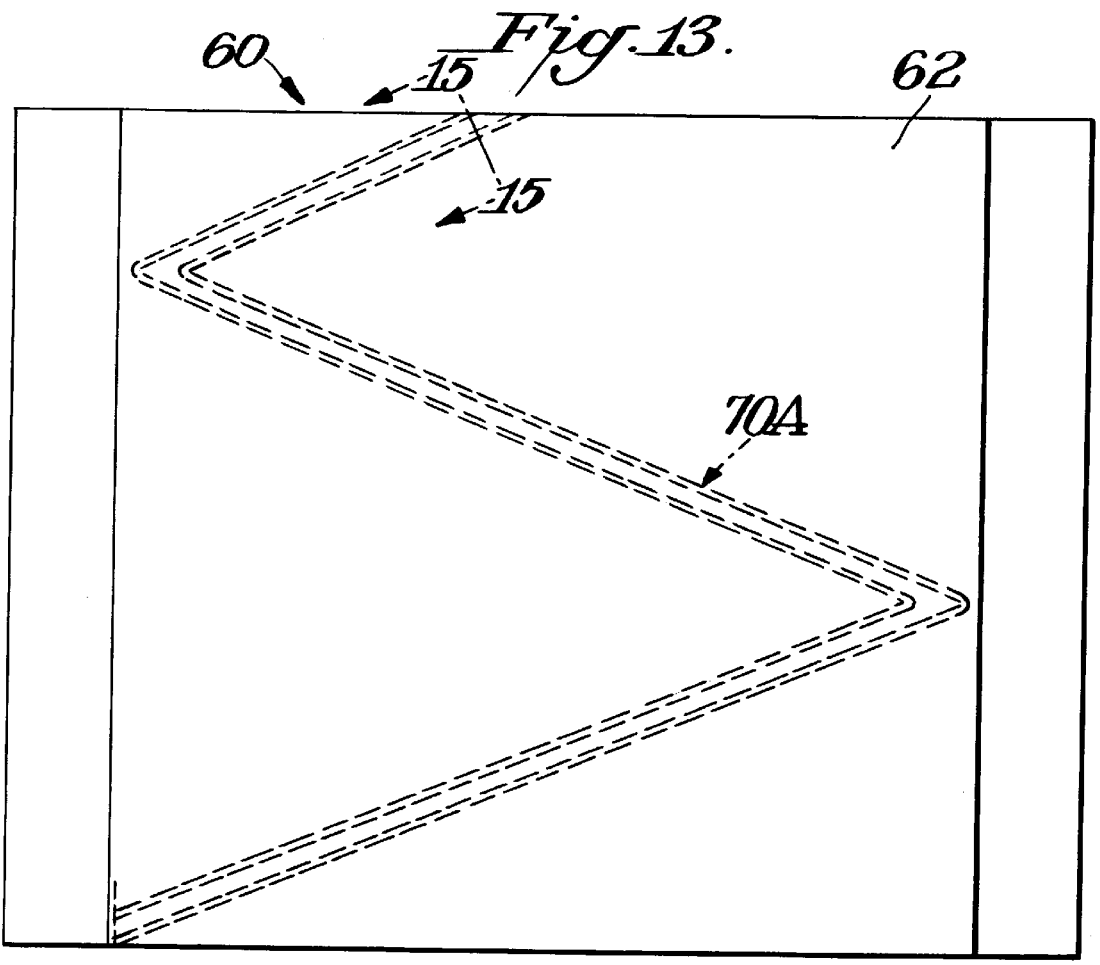
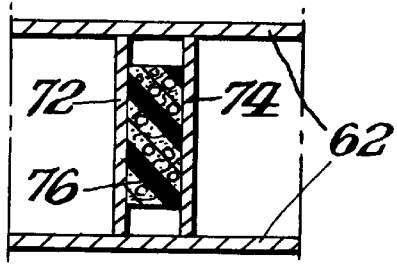 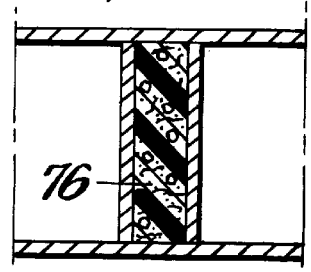

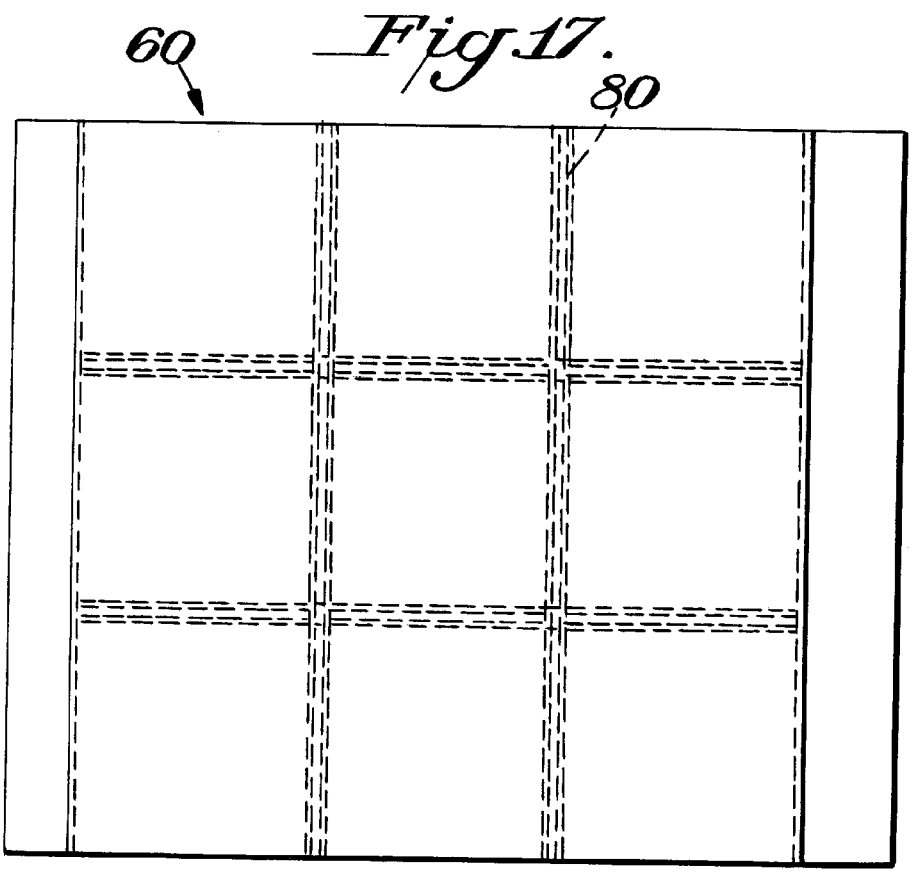
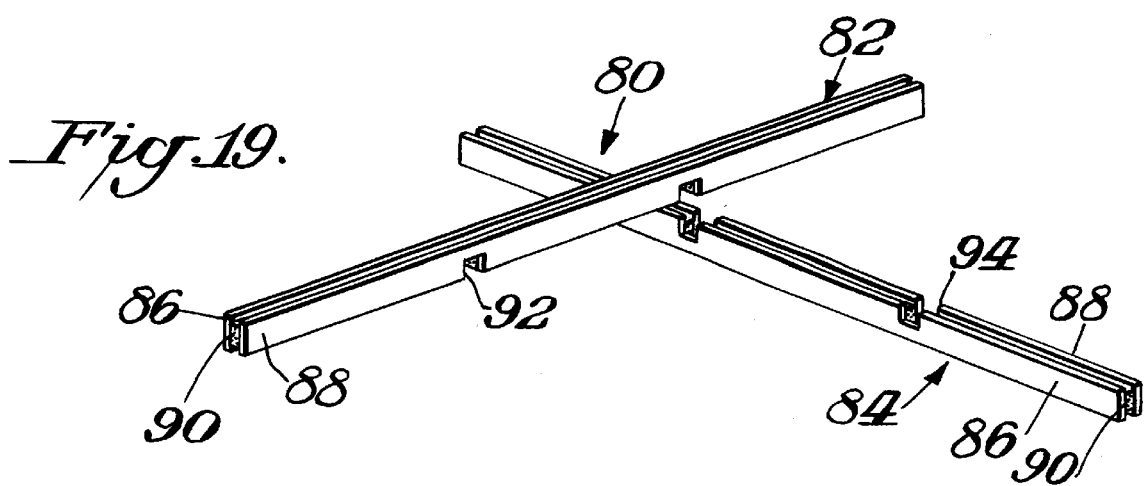

REINFORCED STRUCTURAL ASSEMBLY

BACKGROUND OF THE INVENTION

In various practices it is desired to reinforce a hollow structural assembly, particularly structural members or sections which are subjected to edge or in-plane stresses which would tend to cause the structural member to buckle. Frequently holes are formed in the structural members in order to insert a reinforcement. Where, for example, the structural member is made of steel, the reinforcement is then welded to the structural member. The holes would then be covered with cloth.

It would be desirable if such hollow structural members could be reinforced by placing a reinforcement insert assembly into the hollow structure between the spaced walls in such a manner that would avoid the above problem. Typical applications for such practices could be in the automotive field, such as for reinforcing pillars. Other practices could be in the furniture field, such as for office furniture end shelving units where shelves are locked into vertical end walls or panels.

SUMMARY OF THE INVENTION

An object of this invention is to provide a reinforced structural assembly which meets the above needs.

A further object of this invention is to provide such a reinforced structural assembly which includes a stiffener capable of being readily placed into the assembly.

A still further object of this invention is to provide techniques for reinforcing a structural assembly.

In accordance with one embodiment of this invention a stiffener is formed by interconnecting sets of laminates. Each laminate preferably comprises a carrier member and a cover member with an expandable polymer layer between the members. Preferably the polymer is heat curable. Each laminate contains notches so that the laminates can be interlocked to form a corrugated frame or lattice which may be inserted into a hollow structure. Upon curing and expansion of the polymer a structural foam results which is intimately bonded to the spaced side walls of the hollow structure. The hollow structure may, for example, be a pillar in an automobile or could be a hollow panel of a shelving unit.

In an alternative practice of the invention the stiffener could comprise an inverted U connected to an upstanding U with a common leg. An outward leg at one end of the laminate may extend upwardly beyond the remainder of the laminate so that the laminate could be placed in a lower pillar of a car at the junction of a hollow vertical section with a hollow horizontal section of the pillar for side impact or joint stiffening.

In a further alternative practice of the invention where the stiffener is a drop in insert for reinforcing a shelving unit, such as an office furniture end shelving unit. The laminate may be of straight linear construction and simply dropped into the unit so that the laminate extends generally from top to bottom of the hollow panel of the unit. In a variation the stiffener could be bent such as to form a generally zig-zag shape.

BRIEF DESCRIPTION OF THE DRAWINGS

FIG. 1 is a partial side elevational view showing a door frame lower B pillar of an automobile with a stiffener mounted in place;

FIG. 2 is a side elevational view of the stiffener shown in FIG. 1;

FIG. 3 is a right end elevational view of the stiffener shown in FIGS. 1–2;

FIG. 4 is a perspective view of the stiffener shown in FIGS. 1–3;

FIG. 5 is a view similar to FIG. 1 of an alternative form of stiffener;

FIG. 6 is a side elevational view of the stiffener shown in FIG. 5;

FIG. 7 is an end elevational view of the stiffener shown in FIGS. 5–6;

FIG. 8 is a perspective exploded view of the stiffener shown in FIGS. 5–7;

FIG. 9 is a front elevational view of a reinforced panel in an office furniture end shelving unit incorporating a stiffener in accordance with another alternative of this invention;

FIG. 10 is a top plan view of the panel shown in FIG. 9;

FIG. 11 is a cross-sectional view taken through FIG. 9 along the line 11—11;

FIG. 12 is a view similar to FIG. 11 showing the stiffener after expansion of the foam;

FIG. 13 is a view similar to FIG. 9 of a panel having an alternative view of stiffener in accordance with this invention;

FIG. 14 is a top plan view of the panel shown in FIG. 13;

FIG. 15 is a cross-sectional view taken through FIG. 13 along the line 15—15;

FIG. 16 is a view similar to FIG. 15 showing the foam in its expanded condition;

FIG. 17 is a front elevational view of a reinforced panel for a shelving unit in accordance with still a further embodiment of this invention;

FIG. 18 is a top plan view of the panel shown in FIG. 17; and

FIG. 19 is a perspective exploded view of a portion of the stiffener shown in FIGS. 17–18.

DETAILED DESCRIPTION

The present invention relates to techniques for reinforcing a hollow structural member having a pair of spaced walls so as to prevent buckling. In general, the techniques include providing a stiffener in the form of a carrier member having a layer of expandable polymer so that the stiffener can be readily disposed within the hollow structure between the spaced walls. The polymer is disposed for contacting the spaced walls when the polymer is expanded into a rigid structural foam. As will later be described, the stiffener can take various forms so as to maximize the reinforcing ability and the convenience of assembly of the stiffener.

FIG. 1 illustrates a portion of a lower B pillar for an automobile door frame. The B pillar 10 includes a hollow frame having a generally vertical portion 12 joined to a generally horizontal portion 14. It would be desirable to reinforce the pillar at the junction of the vertical and horizontal portions and particularly to provide the reinforcement so as to interconnect the opposite side walls of the pillar 10 for side impact or joint stiffening. One of the side walls 16 is illustrated. The other side wall would be parallel to and spaced from the illustrated side wall and would have generally the same configuration.

As shown in FIG. 1 a stiffener is located within the hollow structure of pillar 10. FIGS. 2–4 best illustrate the details of stiffener 18. As shown therein a layer of polymer 20 is sandwiched between two support layers 22,24 to form a trilaminate. One of the layers, such as layer 22, would function as a carrier member while the other layer 24 would function as a cover member. Preferably, the layers 22,24 are made of metal, plastic or fiberglass material and preferably are rigid. The polymer layer 20 is preferably made of an expandable resin which upon expansion forms a structural foam or reinforcement that becomes intimately bonded not only to its carrier and cover members 22,24, but also to the spaced walls 16 of the hollow structure 10.

Although stiffener 18 may take any suitable shape, it is preferred to form the stiffener with a non-planar shape that provides for added height where the vertical portion 12 of pillar 10 meets the horizontal portion 14 and to provide greater length within the horizontal portion itself. By having a non-planar or bent structure it is also possible to take into account the location of holes or any objects that might be within the pillar 10.

In the embodiment shown in FIGS. 1–4 the stiffener 18 is in the form of an upstanding U connected to an inverted U. The inverted U has a vertical leg 26 and an opposite vertical leg 28 interconnected by intermediate horizontal portion 30. The upstanding U has a vertical leg 32 and shares the common leg 28. Legs 28 and 32 are interconnected by horizontal portion 34. Each of the remote or outward legs 24,32 terminates in an outwardly extending flange 36. In this manner, the vertical leg 32 extends upwardly into the vertical portion 12 of the pillar while the horizontal connecting portion 30 and the vertical leg 24 extend outwardly into the horizontal portion 14 of pillar 10. Flange 36 extending from leg 24 also extends below connecting portion 34 as best seen in FIGS. 1–2.

Although FIGS. 1–4 illustrate a stiffener to have a double U shape, such shape may also be incorporated in other forms such as a W or M form.

Any suitable materials may be used for the polymer layer 20 and for layers 22 and 36. Reference is made to U.S. Pat. Nos. 5,575,526 and 5,755,486, as well as application Ser. No. 08/675,173 now U.S. Pat. No. 5,888,600 filed Jul. 3, 1996, all of the details of which are incorporated herein by reference thereto. It is preferable to use thin metal layers of sheet/foil thickness for the carrier member 22 and cover member 24. Plastic or fiberglass could also be used. It is also preferable to use a heat expandable resin for the polymer layer 20 which creates the structural reinforcement foam upon curing and expansion. Where the invention is used in an assembly line during vehicle production, the heating step could be accomplished in an oven conventionally used in such assembly lines without requiring a special added heating step. It is to be understood, however, that the invention may also be practiced where, for example, the resin is chemically cured in order to cause expansion.

FIGS. 5–8 illustrate a preferred variation of the invention wherein the stiffener 40 is made of a plurality of components which are interconnected to form a corrugated frame or lattice. FIG. 6, for example, illustrates the stiffener 40 to comprise a pair of laminates 41 and 43. The laminates include U-shaped carriers 42,44 each of which has a layer 46,48 of polymer in its unexpanded condition similar to polymer 20. Preferably, a cover member 50,52 is provided over the polymer similar to the unit 18 described in FIGS. 1–4.

As shown in FIG. 8 each U-shaped laminate 41,43 includes a notch or cutout 56,58 at a connecting portion of the laminate so that the two laminates 41 and 43 may be interconnected by aligning the notches and then moving the two laminates together. The laminates 41 and 43 are of equal width, particularly at the connecting portions. Preferably, the combined length of the two notches 56,58 is equal to the width of each laminate at the connecting portion so that when the two laminates are interconnected, neither of the laminates extends outwardly of the other laminate. In other words, the front faces or walls of the two laminates are coplanar as are the rear faces or walls. Preferably, each notch extends about half-way into its respective laminate. Each notch has a width of 7.6 mm.

The corrugated frame 40 would be placed in a hollow structure such as the pillar 10. The laminate 41 extends into the horizontal portion 14 of pillar 10, while the laminate 43 extends upwardly into the vertical portion 12 of pillar 10. Upon curing and expansion of the polymer 46,48, the resultant structural foam is intimately bonded to the pair of spaced walls 16 of pillar 10.

Stiffener 18 or 40 may be placed in the pillar in any suitable manner such as by being mounted in place before the two walls 16,16 are secured together. The result of incorporating the reinforcement unit in the pillar is to provide a side impact reinforcement or joint stiffening which would be desirable for such structural member.

An example of use for the stiffener in automobiles would be to reinforce a rocker for a lower B pillar and the rear door of an automobile for side impact.

While the invention illustrated in FIGS. 1–8 has been described with respect to its practice in the automotive industry as a reinforcement for hollow structures, the invention may also be practiced in other fields. FIGS. 9–12, for example, illustrate the use of the invention in a hollow panel or side wall 60 which is part of a shelving unit wherein shelves are locked into the end walls of the end unit. As illustrated, panel 60 has a pair of spaced walls 62,62 forming a hollow cavity between the walls. The edges of the walls may be secured together at their flanges 64 by any suitable means such as spot welds 66. Disposed within the hollow space between the walls is a stiffener 70. As shown in FIG. 11 stiffener 70 is a drop in insert which comprises a pair of spaced support members 72,74, similar to the carrier member and cover member of the stiffeners 18 and 40 and which are in contact with walls 62,62. Between the members 72,74 is a polymer layer 76, which is shown in FIG. 11 in its unexpanded condition. Upon curing and expansion of the polymer, the resultant structural foam expands into intimate contact with the walls 62,62 as illustrated in FIG. 12.

Stiffener 70 could be mounted in the hollow space between walls 62,62 in any suitable manner. Preferably, the stiffener 70 could simply be dropped in from the top before any cap closes the top of the hollow space between walls 62,62.

As shown in FIG. 9 the stiffener 70 is generally of a straight linear configuration in that it extends directly from one end to the other of the panel 60 in a straight path. If desired, a plurality of parallel spaced stiffeners 70 may be mounted between walls 62,62.

FIGS. 13–16 show a variation wherein the stiffener 70A is not a straight member, but rather is shaped or bent in a zig zag type manner. This version provides reinforcement over a greater area between the walls 62,62 as compared to the straight structure 70.

FIGS. 17–19 illustrate a preferred variation of the stiffener which is constructed along the same lines as the stiffener 40 in that a plurality of laminates are interconnected to form a corrugated frame or lattice. As illustrated, the stiffener 80 comprises a plurality of first laminates 82 and a plurality of second laminates 84 which extend crosswise the laminates 82. Each laminate comprises a pair of support members 86,88 between which is sandwiched the polymer 90 in the manner previously described. The members 86,88 may thus be considered as a carrier member and a cover member for the polymer layer. Laminate 82 is provided with a plurality of notches 92 to mate with the corresponding notches 94 in laminate 84. Preferably, the combined length of each set of interlocking notches would be equal to the width of each laminate so that the resultant corrugated frame is of uniform thickness in that the laminates terminate coplanar with each other. FIGS. 17–18 show the placement of the corrugated frame 80 between the walls 62,62 of panel 60.

Although the various corrugated stiffeners illustrated herein show the interconnected laminates to be perpendicular to each other it is to be understood that the invention may also be practiced where the laminates are at a non-perpendicular angle with respect to each other. In such practices, the notches would preferably extend at an angle across each laminate.

The corrugated frame can readily be dropped in through the open top of the panel 60 and act as a brace which, because of its open areas, could be shaped to avoid holes and accommodate any irregularities in the panel.

In the various embodiments, the carrier member and cover member each may be made, for example, of 0.8 mm of galvaneal steel. The polymer layer before curing may be a strip of polymer 6 mm by 75% of the spacing between the walls. The spacing between the walls 62,62 may be 25.4 mm. The carrier and cover members may be 0.8 mm thick.

As previously described, the preferred practice of the invention consists of a three layer reinforcement made up from two outer layers of metal, plastic, or fiberglass and an inner layer of heat curable polymer. The inner layer would be extruded onto one of the outer layers in a continuous fashion and the other outer layer would be rolled on top of the inner polymer layer. The sandwich would then be sent through a set of roll formers or pinch rollers, notched or trimmed, and then cut to length. The use of pinch rollers or a set of roll formers for the polymer and support member (one layer or two layers) shapes a cross section in a continuous manner for the laminate before being cut to length. Alternatively, the polymer and support member could be stamped to its desired shape by means of a chilled stamping die. The support member acts to assist in maintaining part shape and the cooling of the polymer layer in the stamping die or by ambient or chilled air in the roll forming process also "sets" the part shape. The coincidental forming of the polymer and support member at the same time differs from the current process which involves the separate forming of the polymer layer and support member and then hand placement of the polymer layer onto the carrier/support member.

Separate pieces would be notched (if appropriate) and cut to length whereby one trilaminate snaps into another trilaminate such that a 'residential window grill or corrugated carton partition' is formed. FIG. 19 shows the simplest configuration which could be used for an office furniture end shelving unit. See FIG. 17. FIGS. 6–8 shows this approach for a lower B pillar of a car for side impact or joint stiffening.

In the practice of the invention the two outer layers are rigid enough to support the diaphragms or stiffeners such that they retain their shape during forming, handling, and heat curing of the inner polymer layer and that they constrain the polymer such that the polymer expands in the plane of the laminate and consequently bonds to the walls of the hollow section to be reinforced. The interlocking nature of laminates allows for internal, self-supporting bulkheads to be placed in key areas of the hollow sections such that premature buckling of the parent or main hollow sections does not take place under applied loads.

A trilaminate is preferably formed by an in-line extrusion roll forming process such that trimmed, bent, notched, and cut lengths can be fabricated into interlocking support shapes. The interlocking sections whether they be straight or bent can be used to reinforce hollow sections in key or critical areas thereby minimizing material usage through effective placement of the interlocking bulkheads or diaphragms. This approach lends itself to application in difficult areas to be reinforced. The interlocking laminates prevent thin section wall buckling due to wall stresses caused by bending or axial loading. Also, another important feature is that the two outside laminate skins or layers constrain the polymer towards bonding one side of the section to the other plus bonding the laminate layers to themselves. The interlocking trilaminate is another means of tying the M-6522 side walls of a thin gage section together apart from filling a section solid with foam or lining the interior walls of a hollow section with a polymer laminate.

In practice, when forming the various stiffeners, a layer of polymer resin would be extruded onto the carrier member. In the broad practice of the invention the unit could include a laminate structure comprising only the carrier member and layer of resin. In the preferred practice, however, the cover member is added on the exposed side of the resin layer to sandwich the layer between the two support members. By having two support members the polymer is constrained and upon expansion of the foam the members direct the foam into bonding contact with the thin walls of the hollow structure. Where the stiffener is formed in an in line process the laminate structure would then be chilled at, for example, a temperature in the range of 0° to –40° F. After chilling any necessary trimming or notching could be done using any suitable techniques such as die cutting or the application of a water jet. The laminate would then be cut to length and where necessary would be bent to its desired shape. Where the unit is a corrugated frame the individual laminates would then be interlocked with each other at the notches formed in the connecting portions of the laminate.

What is claimed is:

1. A stiffener for reinforcing a hollow structure having a pair of spaced walls, said stiffener comprising a first carrier member, a first layer of expandable polymer on said first carrier member for creating a structural reinforcement member when said polymer is expanded, said first carrier foam and said first layer comprising a first laminate, a second carrier member, a second layer of said polymer on said second carrier member, said second carrier member and second layer comprising a second laminate, said first laminate having a connecting portion, a notch in said connecting portion of said first laminate, said second laminate having a connecting portion, a notch in said connecting portion of said second laminate, said first laminate and said second laminate being interconnected by said connecting portions being interlocked at said notches, and said connected laminates creating a corrugated frame which may be inserted into the hollow structure between the spaced walls.

2. The stiffener of claim 1 including a first cover member mounted over said first layer to comprise part of said first laminate, a second cover member mounted over said second layer to comprise part of said second laminate, and said carrier member and said cover member being rigid.

3. The stiffener of claim 2 wherein said second laminate comprises a bulkhead of lesser length than said first laminate.

4. The stiffener of claim 2 wherein said connecting portions are generally perpendicular to each other.

5. The stiffener of claim 2 wherein said connecting portion of said first laminate has the same width as said connecting portion of said second laminate, each of said notches extending into its respective laminate a distance wherein the combined distance of the interconnected notches is equal to said width of said connecting portions so that said connecting portions have coplanar outer edges.

6. The stiffener of claim 5 wherein each of said first laminate and said second laminate is U-shaped, said first laminate being longer than said second laminate, and said second laminate being higher than said first laminate.

7. The stiffener of claim 6 wherein each of said notches extends about halfway through its respective first laminate and second laminate, and said carrier member and said cover member each being made of a rigid material.

8. The stiffener of claim 6 wherein said stiffener is in combination with a hollow structure which is part of an automobile.

9. The combination of claim 8 wherein said hollow structure is a pillar having an elongated hollow vertical portion connected at a junction to an elongated horizontal portion, and said stiffener being located at said junction.

10. The stiffener of claim 5 wherein there are a plurality of said first laminates and a plurality of said second laminates, each of said first laminates having a plurality of said notches, each of said second laminates having a plurality of said notches, and said plurality of said first laminates being connected to said plurality of said second laminates by the interconnection of said plurality of said notches.

11. The stiffener of claim 10 wherein each of said first laminates and said second laminate is of straight linear shape.

12. The stiffener of claim 11 in combination with a shelving unit having a hollow side panel which comprises said hollow structure, said stiffener being located in said hollow structure, and said structural foam being intimately bonded to said spaced walls of said panel.

13. The stiffener of claim 1 wherein said connecting portions are generally perpendicular to each other.

14. The stiffener of claim 1 wherein said connecting portion of said first laminate has the same width as said connecting portion of said second laminate, each of said notches extending into its respective laminate a distance wherein the combined distance of the interconnected notches is equal to said width of said connecting portions so that said connecting portions have coplanar outer edges.

15. The stiffener of claim 1 wherein each of said first laminate and said second laminate is U-shaped, said first laminate being longer than said second laminate, and said second laminate being higher than said first laminate.

16. The stiffener of claim 1 wherein each of said notches extends about halfway through its respective first laminate and second laminate, and said carrier member and said cover member each being made of a rigid material.

17. The stiffener of claim 1 wherein said stiffener is in combination with a hollow structure which is part of an automobile.

18. The combination of claim 17 wherein said hollow structure is a pillar having an elongated hollow vertical portion connected at a junction to an elongated horizontal portion, and said stiffener being located at said junction.

19. The stiffener of claim 1 wherein there are a plurality of said first laminates and a plurality of said second laminates, each of said first laminates having a plurality of said notches, each of said second laminates having a plurality of said notches, and said plurality of said first laminates being connected to said plurality of said second laminates by the interconnection of said plurality of said notches.

20. The stiffener of claim 1 wherein each of said first laminates and said second laminates is of straight linear shape.

21. The stiffener of claim 1 wherein said stiffener is in combination with a shelving unit having a hollow side panel which comprises said hollow structure, said stiffener being located in said hollow structure, and said structural foam being intimately bonded to said spaced walls of said panel.

22. The stiffener of claim 1 wherein said second laminate comprises a bulkhead of lesser length than said first laminate.

23. A method of making a stiffener and reinforcing a hollow structure with the stiffener comprising the steps of mounting a layer of expandable polymer on a carrier member to create a laminate, cutting the laminate to a predetermined length and thereby creating a stiffener, disposing the stiffener between spaced walls of the hollow structure, and curing and expanding the polymer to create a structural reinforcement foam which becomes intimately bonded to the spaced walls and to the members.

24. The method of claim 23 wherein the layer of resin is mounted on the carrier member by extruding the layer on the carrier member, and rolling a top member on top of the polymer layer to create a trilaminate.

25. The method of claim 24 including bending the trilaminate to a predetermined shape.

26. The method of claim 25 including trimming and notching the trilaminate before it is cut to length, interconnecting the trilaminate with a further trilaminate to form a corrugated frame, and the corrugated frame comprising the stiffener.

27. The method of claim 26 including chilling the trilaminate before it is bent.

28. The method of claim 26 including reinforcing the hollow structure by mounting the stiffener into an automobile lower pillar which comprises the hollow structure.

29. The method of claim 26 including reinforcing the hollow structure by mounting the stiffener into a hollow panel of a shelving unit which comprises the hollow structure.

30. The method of claim 25 including reinforcing the hollow structure by mounting the stiffener into an automobile lower pillar which comprises the hollow structure.

31. The method of claim 25 including reinforcing the hollow structure by mounting the stiffener into a hollow panel of a shelving unit which comprises the hollow structure.

32. The method of claim 23 wherein the laminate is passed through a set of roll formers to shape its cross section in a continuous manner before being cut to length.

33. The method of claim 23 wherein the laminate is chill stamped into shape as the cutting step.

34. The method of claim 23 including trimming and notching the laminate before it is cut to length, interconnecting the laminate with a further laminate to form a corrugated frame, and the corrugated frame comprising the stiffener.

35. The method of claim 23 including chilling the laminate before it is bent.

36. The method of claim 23 including reinforcing the hollow structure by mounting the stiffener into an automobile lower pillar which comprises the hollow structure.

37. The method of claim 23 including reinforcing the hollow structure by mounting the stiffener into a hollow panel of a shelving unit which comprises the hollow structure.

38. The method of claim 23 including reinforcing the hollow structure by mounting the stiffener into an automobile lower pillar which comprises the hollow structure.

39. The method of claim 23 including reinforcing the hollow structure by mounting the stiffener into a hollow panel of a shelving unit which comprises the hollow structure.

* * * * *